(12) United States Patent
Han

(10) Patent No.: US 6,421,094 B1
(45) Date of Patent: Jul. 16, 2002

(54) HDTV VIDEO DISPLAY PROCESSOR

(75) Inventor: Dongil Han, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/148,859

(22) Filed: Sep. 8, 1998

(30) Foreign Application Priority Data

Dec. 1, 1997 (KR) .............................. 97-65029

(51) Int. Cl.[7] .......................... H04N 5/445; H04N 5/46; H04N 5/45
(52) U.S. Cl. .................... 348/569; 348/555; 348/557; 348/566
(58) Field of Search ................ 348/569, 554, 348/555, 557, 563, 564, 565, 566, 567, 584, 589, 598, 599, 600, 441, 453, 454, 457; H04N 5/445, 5/45, 7/01, 5/46, 9/74, 9/76

(56) References Cited

U.S. PATENT DOCUMENTS 6,175,387 B1 * 1/2001 Han ........................... 348/565
6,204,884 B1 * 3/2001 Lee ........................... 348/555

* cited by examiner

*Primary Examiner*—Sherrie Hsia
(74) *Attorney, Agent, or Firm*—Birch, Stewart, Kolasch & Birch, LLP

(57) ABSTRACT

A HDTV video processor includes a data input part for processing the video data having different image formats, format information and control signals; a memory interfacer for imaging the access to the memory, a format converter converting the input data format to the output data format, an On Screen Display processor overlaying an OSD data on the converted data, a color space converter and video processor carrying out a variety of processes to display the input data. The processor not only interfaces DTV videos of various sizes and frame rates, but also interfaces the NTSC or VGA signals, allowing the display of the DTV, NTSC or VGA video in the forms of PIP, multi-PIP, zoom.

20 Claims, 3 Drawing Sheets

HDTV VIDEO DISPLAY PROCESSOR

BACKGROUND OF THE INVENTION

1. Field of the Invention

The present invention relates to a digital TV, and more particularly to a video display processor for a High Definition Television.

2. Discussion of the Related Art

The Grand Alliance of the United States allows many types of video formats for a digital TV. Accordingly, the digital TV receiver must be capable of processing the many types of transmitted video formats including different frame rates of 24 Hz, 30 Hz, 60 Hz for interlaced scanning or progressive scanning, and different image resolutions of 480×640, 480×704, 720×1280, 1080×1920. However, even if a High Definition TV (HDTV) receiver successfully processes the video format to initiates the display, the HDTV transmissions may have to broadcasted simultaneously with the pre-established NTSC broadcasting for an indefinite period of time. Thus, the HDTV display processor should also be capable of receiving and displaying both the digital and analog video formats of the NTSC transmissions.

Moreover, because the PC monitor has a better picture quality than the conventional NTSC monitor, the viewers may choose the PC monitor as the digital TV receiver. Accordingly, the digital TV processor should further be capable of receiving and displaying the VGA signals of the PC data. Therefore, the video processor for a HDTV ideally requires converting the digital signals, the NTSC signals, and the VGA signals as well as the On Screen Display (OSD) data into an uniform frame size and a Y Cb Cr color system.

In a related art, the format conversion and the OSD processing were performed prior to the analog signal processing. However, such analog processing requires additional hardware, including a memory for an OSD data processing.

SUMMARY OF THE INVENTION

Accordingly, an object of the present invention is to solve at least the problems and disadvantages of the related art.

Another object of the present invention is to optimize the necessary hardware for a HDTV video processor in converting data of various color formats into a uniform format. More particularly, an object of the present invention is to optimize the hardware for an OSD data processing in converting data of various color formats and OSD formats into a uniform format.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, the HDTV video processor includes a format converter, a OSD processor, and a color space converter arranged in a successive order to convert the video image data from a multiple color formats into a RGB color space without the necessity of an additional memory.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENT

Figure 1:
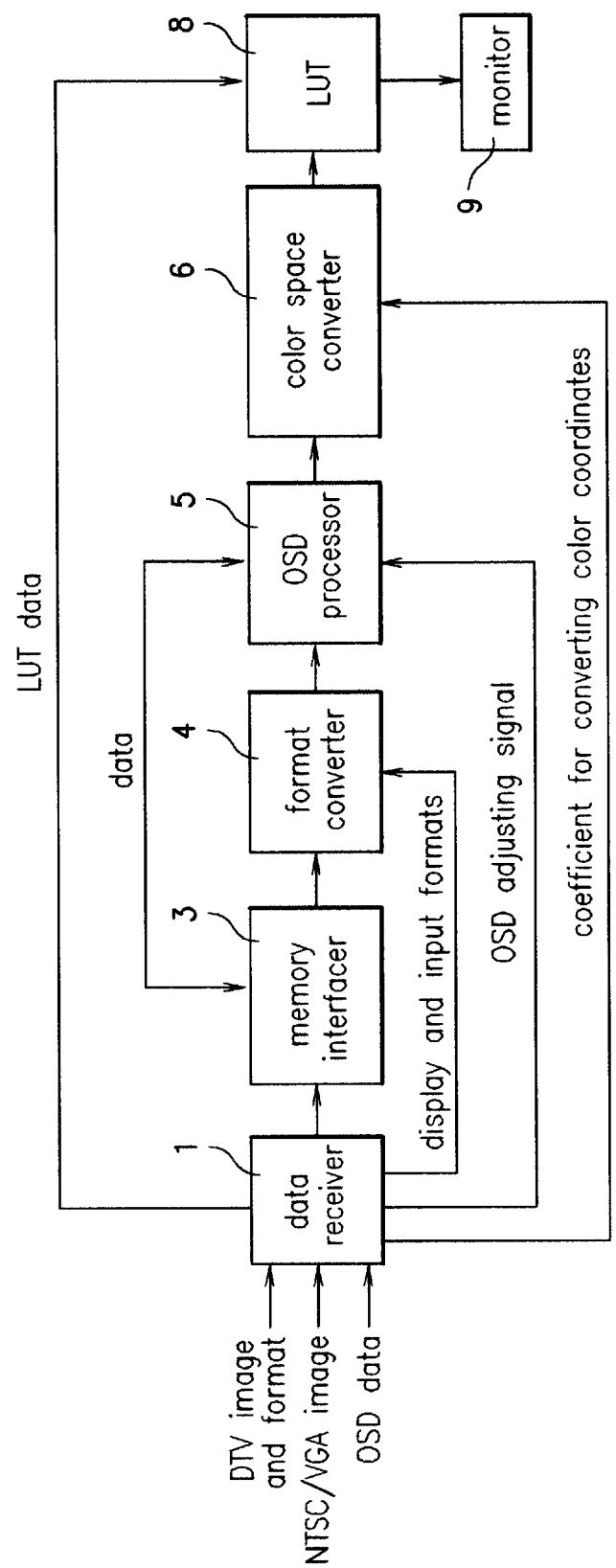
FIG. 1 is a block diagram of a HDTV video processor in accordance with a preferred embodiment of the present invention.

FIG. 1 shows a preferred embodiment of a HDTV video processor according to the present invention including a data receiver 1 processing and outputting a digital TV (DTV) video data, NTSC or VGA video data having different color formats, the format information and various control signals; a memory interfacer 3 selecting one of the data output by the data receiver and writing on or reading from a memory the selected data; a format converter 4 converting the selected video data from the memory interfacer into a uniform color format using the display and video format information from the data receiver; an OSD processor 5 overlaying an OSD data on the converted video data; a color space converter 6 converting the OSD overlaid video data into a RGB color system according to the color coordinate converting coefficients from the data receiver; a Look Up Table (LUT) 8 further processing the video data in the RGB color format; and a monitor 9 displaying the video image.

By arranging the format converter, the OSD processor, and the color space converter in a successive order to convert the video image data into a uniform color format, overlaying an OSD data thereon and directly converting the overlaid data into a RGB color space, the need for an additional memory is eliminated thereby providing the users a simple hardware design. A detailed description of the preferred embodiment will follow in reference to FIG. 2 below.

Figure 2:
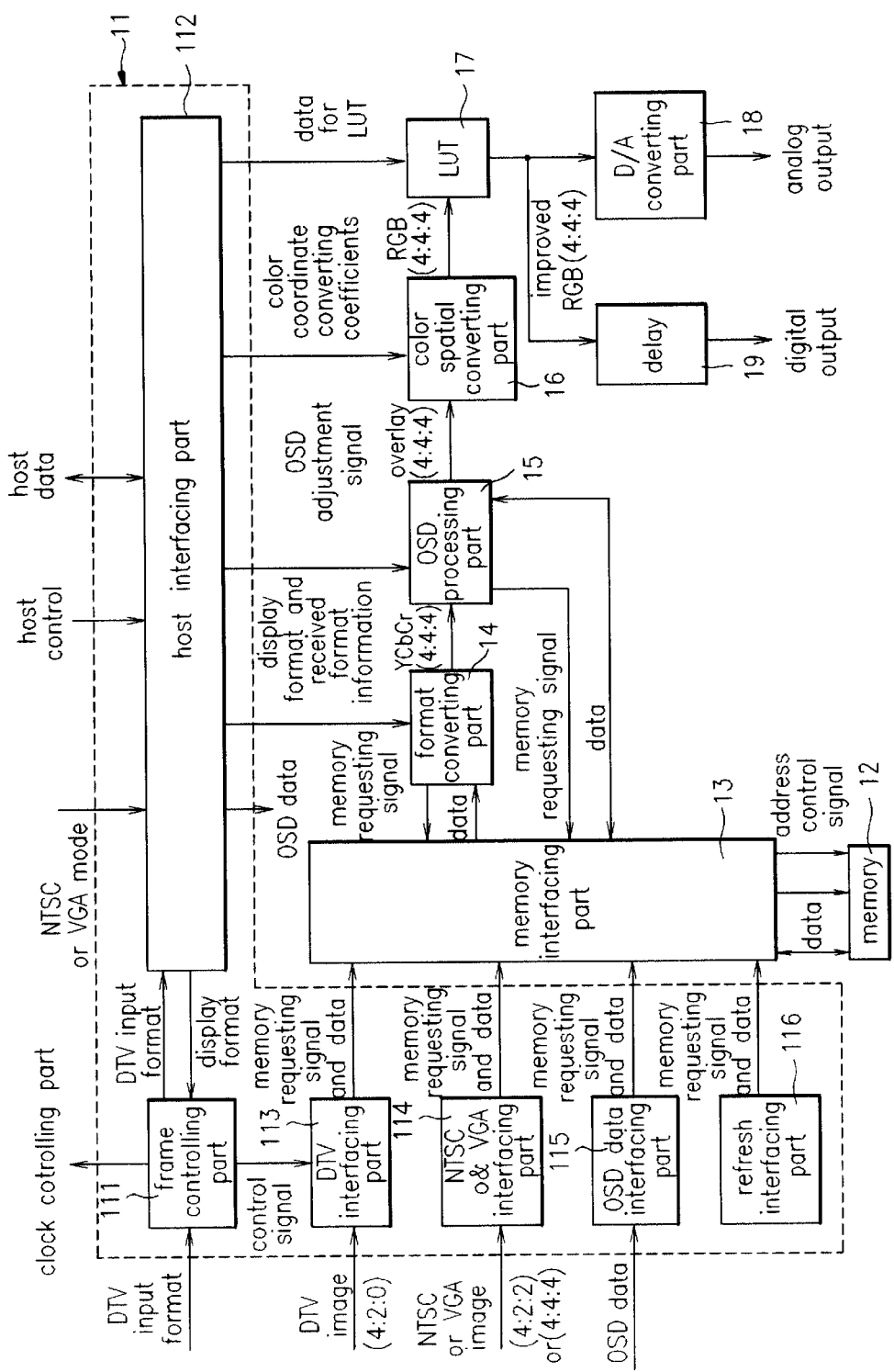
FIG. 2 is an expanded block diagram the HDTV video processor in FIG. 1.

Referring to FIG. 2, the preferred embodiment of the HDTV video processor includes a data receiver 11 receiving and outputting a DTV video data having different color formats, an NTSC or VGA video data, the format information on each respective video data, and various control signals; a memory 12 writing/reading the video data on/from a designated address; a memory interfacer 13 selecting the video data output from the data receiver and managing the writing/reading of the selected data on/from the memory 12; a format converter 14 converting the video data from the memory 13 to a uniform color format using the display and video format information from the data receiver 11; an OSD processor 15 overlaying an OSD data on the converted video data; a color space converter 16 converting the OSD overlaid video data into a video data in the RGB color system according to color coordinate converting coefficients from the data receiver 11; a LUT 17 receiving the video data in the RGB color format and adjusting the color contents of the image, i.e. the white balance, the black level extension, and the negative film mode, according to the LUT data from the data receiver 11; a Digital to Analog (D/A) converter 18 converting the digital RGB video data to an analog form; and a buffer 19 delaying the digital RGB video data from the LUT 17 to synchronize the digital video data with the analog video data.

The data receiver 11 further includes a frame controller 111 receiving and timely controlling the frame rate of the DTV video image; a host interfacer 112 receiving the DTV video format information from the frame controller 11, the NTSC and VGA mode signal and the host interface signal, and outputting an OSD data, display format information, input format information, and various control signals; a DTV interfacer 113 receiving the DTV video image and outputting the data to the memory interfacer 13; an NTSC/VGA interfacer 114 receiving and interfacing either the NTSC video or the VGA video; an OSD data interfacer 115 receiving the OSD data from the host interfacer 112 and interfacing the OSD data for storage in the memory 12; and a memory refresher 116 refreshing the memory at fixed intervals.

Figure 3:
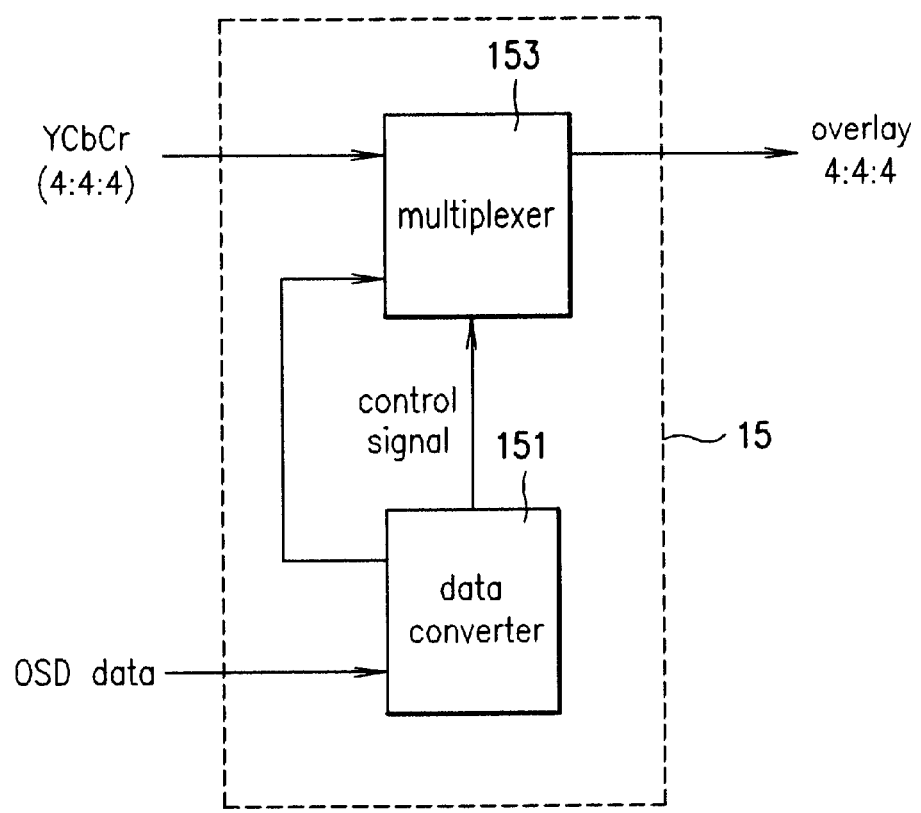
FIG. 3 is a block diagram of the OSD processor in FIG. 1.

As shown in FIG. 3, the OSD processor 15 also further includes a data converter 151 which receives and converts the OSD data output from the memory interfacer 13 into a uniform format and outputs a control signal to output the data in the selected OSD receiver; and a multiplexer (MUX) 153 which overlays the converted data from the format converter 14 with the OSD data output from the data converter 151 according to the control signal from the data converter 151.

Referring back to FIG. 2, the frame controller 111 receives the DTV video information which will be output to the DTV interfacer 113 and generates various control signals necessary to display the HDTV. The DTV video information contains, among other information, the numbers of vertical and horizontal pixels, the frame rates (60 Hz, 30 Hz, 24 Hz), progressive/interlaced scanning.

The host interfacer 112 exchanges information between the HDTV display processor and the external device. Particularly, the host interfacer 112 may use an I2C bus which communicates with 2 pins. The host interfacer 112 also receives the NTSC or VGA mode in order to gather the necessary information output to the NTSC/VGA interfacer 114. The hot interfacer 112 generates data including the input/output video format, the OSD control signals, the color coordinate converting coefficients, and the data for the LUT.

The DTV interfacer 113 receives video data from a video decoder (not shown) and in response to the control signal from the frame controller 111, outputs a memory access signal to the memory interfacer 13. Responsive to the access signal, the memory interfacer 13 writes or reads the data output by the DTV interfacer 113 on or from the appropriate location of the memory 12. If the display format is for a DTV PIP window, the video image received in the DTV interfacer 113 is decimated to an appropriate size and the memory interfacer 13 stores the data in the appropriate location in the memory 12.

The NTSC/VGA interfacer 114 receives the NTSC or VGA video data and according to the video synchronization signal, outputs a memory access signal to the memory interfacer 13. Responsive to the access signal, the memory interfacer 13 writes the data output by the NTSC/VGA interfacer 114 or reads the data on or from the appropriate location of the memory 12. If the display format is for a NTSC/VGA PIP window, the video image received in block units is decimated to extract and store the appropriate lines and pixels in the memory 12.

The current input information format uses the NTSC/VGA mode signal. Particularly, the signal is used to determine if the input video image is in the NTSC, the double scanned NTSC, the VGA or the SVGA form and according to the determined format, an appropriate process is carried out.

The OSD interfacer 115 receives the OSD data and using the address and data from the host interfacer 112, outputs a memory access signal to the memory interfacing part 13. In response to the access signal, the memory interfacer 13 writes the data output by the OSD interfacer 115 or reads the data on or from the appropriate location of the memory 12.

If the DTV interfacer 113, the NTSC/VGA interfacer 114, and the OSD interfacer 115 simultaneously output a memory access signal, the memory interfacer 13 determines the priorities and based on the priorities, provides access to the important data. Thus, the memory interfacer 13 receives the access signals generated by the various blocks and coordinates the access rights to the memory 12 by giving access to the most pertinent block.

The memory refresher 116 outputs a memory refresh signal to the memory interfacer 13 every 16 ms~32 ms. In response to the memory refresh signal, the memory 12 read the video data every 16 ms~32 ms, thereby refreshing the memory 12 at fixed intervals. Moreover, if only the OSD memory region was systematically refreshed, a waste of a memory bandwidth due to the refresh can be prevented.

The format converter 14 receives the DTV or the NTSC/VGA video data through the memory interfacer 13 and converts the input format of the data to the designated output format according to the display and video format output by the host interfacer 112. Specifically, the format converter 14 receives the DTV or NTSC/VGA video data having a YCbCr color format of 4:4:4, 4:2:2, or 4:2:0 and outputs a converted video data having a uniform YCbCr color format of 4:4:4.

The format converter 14 is also capable of processing the data for display format requiring various video sizes. For example, if a display format is for a PIP, the format converter 14 can process a NTSC PIP with the DTV displayed as a main frame or a DTV PIP with the NTSC displayed as a main frame. Also, if a High Definition format is received, the format converter 14 can convert the video data to zoom the display and if a Standard Definition format is received, the format converter 14 converts the video data with aspect ratio from 4:3 to 16:9.

The OSD processor 15 receives the converted data from the format converter 14 and overlays both the DTV or NTSC/VGA images with the OSD data stored in the memory 12. As shown in FIG. 3, the data converter 151 outputs the memory access signal to the memory interfacer 13 and reads the OSD data stored in the memory 12. The data converter 151 converts the read OSD data having a YCbCr color format of 4:4:4, 4:2:2, or 4:2:0 into one uniform YCbCr color format of 4:4:4 and outputs the converted data to the MUX 153. The data converter 151 also generates a control signal to the MUX 153 for outputting the OSD data to the OSD location.

The MUX 153 receives the converted OSD data from the data converter 151 and the converted DTV or NTSC/VGA data from the format converter 14. According to the control signal from the data converter 151, the MUX 153 overlays the DTV or NTSC/VGA data with the OSD data and outputs the overlaid data to the color space converter 16.

The color space converter 16 stores matrix coefficients and uses the matrix to convert the received dita in the YCbCr format into a RGB format or a YCbCr format. The color space converted data is output to the LUT 17. The matrix conversion coefficients may differ depending on the situation, in which case the color space converter 16 receives color coordinate converting coefficients from the host interfacer 112 to convert the matrix coefficients, thereby a variety of color coordinate conversions are carried out.

The LUT 17 converts and outputs the RGB format data received from the color space converter 16 into another signal format. Particularly, the LUT 17 has various RGB tables and using the LUT data from the host interfacer 112, outputs a signal format as received, as an inverted signal, or as a multilevel signal, thereby providing various image effects. Also, if the RGB format data is dark, the LUT 17 brightens the data by raising the signal level or by adjusting the signal levels of each RGB signals to correct the white balance.

The D/A converter 18 receives the digital video data from the LUT 17 and outputs an analog signal. However, the LUT 17 outputs the digital signal at a rate faster than the analog signal output by the D/A converter 18. Thus, the LUT 17 outputs the digital signal through the buffer 19 which delays and synchronously outputs the digital signal to the analog signal.

The HDTV video processor according to the present invention, not only can interface DTV videos of various sizes and frame rates, but can also interface current NTSC or VGA signal, thereby allowing the display of DTV video, and NTSC or VGA video. Moreover, with an optimal configuration, the processor can display data forms of PIP, multi-PIP, zoom, OSD, color space conversion, LUT and the like.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A video processor comprising:
    a data processor receiving video data having different image formats and receiving format information, said data processor selectively storing and outputting one of the data having an image format and outputting the format information;
    a format converter receiving the selected data and format information from said data processor and converting the image format of the selected data according to the format information, said format converter outputting a converted data;
    an OSD processor receiving the converted data from said format converter and overlaying the data with an OSD data; said OSD processor outputting an OSD overlaid data; and
    a color processor receiving the OSD overlaid data, said color processor converting the color format of the data into a display color format according to the format information and outputting a digital data.

2. A video processor of claim 1, further comprising:
    a digital to analog converter receiving the digital data from said color processor and converting the digital data to an analog signal.

3. A video processor of claim 2, further comprising:
    a buffer delaying the output of the digital data from said color processor for the period necessary for said digital to analog converter to convert the digital data.

4. A video processor of claim 1, wherein said data processor comprises:
    a data receiver receiving and outputting video data having different image formats; said data receiver also receiving and outputting format information; and
    a memory coordinator receiving the video data having different image formats and selectively storing and outputting one of the data having a certain image format.

5. A video processor of claim 4, wherein said data receiver receives DTV, NTSC, and VGA video data.

6. A video processor of claim 5, wherein said data receiver comprises:
    a frame controller receiving and outputting the size and the frame rate of the video data, said frame controller generating a control signal to timely output the video data;
    a host interfacer receiving the video format information from said frame controller and outputting an OSD data, a display format information and a plurality of control signals necessary for interfacing the video data;
    a DTV interfacer receiving the video data and in response to the control signal from the frame controller outputs the video data to said memory coordinator;
    an NTSC/VGA interfacr receiving and outputting either the NTSC video or the VGA video to said memory coordinator; and
    an OSD data interfacer receiving the OSD data from said host interfacer and interfacing the OSD data for storage in said memory coordinator.

7. A video processor of claim 4, wherein said memory coordinator comprises a memory;
    a memory interfacer receiving the video data having different image formats from said data receiver; and
    wherein said data receiver outputs memory access signals and responsive to said access signals, said memory interfacer selectively stores or outputs one of the data having an image format in or from said memory.

8. A video processor of claim 7, wherein said memory interfacer selectively stores or outputs one of the data by determining the priorities to access said memory.

9. A video processor of claim 7, wherein said data processor comprises:
    a memory refresher refreshing said memory at fixed intervals.

10. A video processor of claim 1, wherein said format converter converts the image format of the selected data into a display format.

11. A video processor of claim 1, wherein said format converter further converts the video size of the selected data according to the format information.

12. A video processor of claim 1, wherein said data processor outputs an OSD data and said OSD processor comprises:
    a data converter coupled to said data processor to receive the OSD data and converting the OSD data into a uniform format, said data converter outputting the OSD converted data and generating a control signal for outputting the OSD data; and
    a multiplexer receiving the OSD converted data from said data converter and the converted data from said format converter, said multiplexer overlaying the converted data with the converted OSD data according to the control signal from said data converter and outputting an OSD overlaid data.

13. A video processor of claim 1, wherein said color processor comprises:
    a color space converter receiving the OSD overlaid data from said OSD processor and converts the color format of the OSD overlaid data into a RGB or YCbCr format, said color space converter outputting the data with a RGB or YCbCr color format; and
    a LUT receives the data with a RGB or YCbCr color format and converts the data into another form of data for the display according to an LUT data.

14. A video processor of claim 13, wherein said color space converter stores matrix coefficients to convert the color format into a RGB or YCbCr format.

15. A video processor of claim 13, wherein said color space converter is coupled to said data receiver to receive a color coordinate converting coefficients and uses the converting coefficients to convert the color format into a RGB or YCbCr format.

16. A video processor of claim 13, wherein said LUT converts the data into an inverted signal, a multilevel signal or outputs the signal with a format as received.

17. A video processor comprising:
a data receiver receiving and outputting video data having different image formats, said data receiver also receiving and outputting format information;
a memory coordinator receiving the video data having different image formats and selectively storing and outputting one of the data having a certain image format;
a format converter receiving the selected data from said memory coordinator and format information from said data receiver and converting the image format of the selected data according to the format information, said format converter outputting a converted data;
a data converter coupled to said data receiver to receive the OSD data and converting the OSD data into a uniform format, said data converter outputting the OSD converted data and generating a control signal for outputting the OSD data;
a multiplexer receiving the OSD converted data from said data converter and the converted data from said format converter, said multiplexer overlaying the converted data with the converted OSD data according to the control signal from said data converter and outputting an OSD overlaid data; and
a color processor receiving the OSD overlaid data, said color processor converting the color format of the data into a display color format according to the format information and outputting a digital data.

18. A video processor comprising:
a data receiver receiving and outputting video data having different image formats, said data receiver also receiving and outputting format information;
a memory;
a memory interfacer receiving the video data having different image formats from said data receiver and selectively storing and outputting one of the data having a certain image format in or from said memory;
a format converter receiving the selected data through said memory interfacer and the format information from said data receiver and converting the image format of the selected data according to the format information, said format converter outputting a converted data;
an OSD processor receiving the converted data from said format converter and overlaying the data with an OSD data; said OSD processor outputting an OSD overlaid data; and
a color processor receiving the OSD overlaid data and the format information from said data processor, said color processor converting the color format of the data into a display color format according to the format information and outputting a digital data;
wherein said data receiver comprises:
a frame controller receiving and outputting the size and the frame rate information of the video data, said frame controller generating a control signal to timely output the video data;
a host interfacer receiving the video format information from said frame controller and outputting an OSD data, a display format information and a plurality of control signals necessary for interfacing the video data;
a DTV interfacer receiving the video data and in response to the control signal from the frame controller outputs the video data to said memory interfacer;
an NTSC/VGA interfacer receiving and outputting either a NTSC video or a VGA video to said memory interfacer; and
an OSD data interfacer receiving the OSD data from said host interfacer and interfacing the OSD data for storage in said memory; and
a memory refresher refreshing said memory at fixed intervals.

19. A video processor of claim 18, wherein said memory refresher refreshes only the OSD memory portion of said memory at fixed intervals.

20. A method for processing a video data comprising:
receiving video data having different image formats and receiving format information;
selectively storing and outputting one of the data having a certain image format and outputting the format information;
receiving the selected data and format information and converting the image format of the selected data according to the format information;
directly receiving the format converted data and overlaying the data with an OSD data; and
directly receiving the OSD overlaid data and converting the data into a display color format according to the format information.

* * * * *